Figure 1:
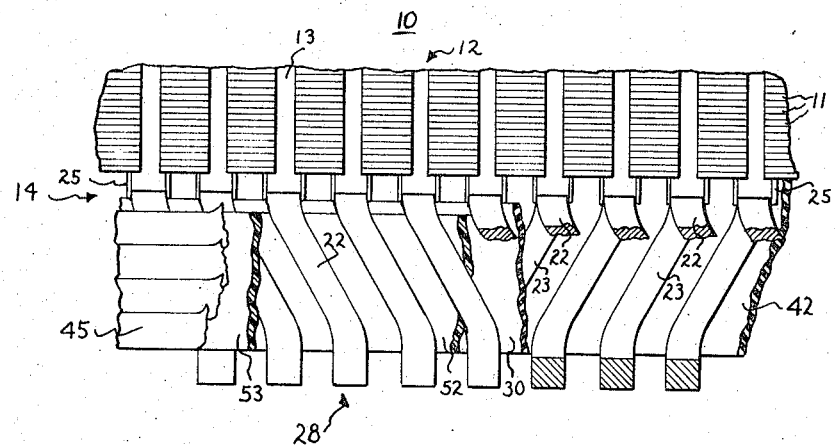

Jan. 23, 1968 W. B. PENN 3,365,600
DYNAMOELECTRIC MACHINE END TURN INSULATION PROTECTION SYSTEM
Filed Jan. 13, 1965

INVENTOR.
WILLIAM B. PENN
BY *Joseph V. Claeys*
HIS ATTORNEY

United States Patent Office 3,365,600
Patented Jan. 23, 1968

3,365,600
DYNAMOELECTRIC MACHINE END TURN
INSULATION PROTECTION SYSTEM
William B. Penn, Erie, Pa., assignor to General Electric
Company, a corporation of New York
Filed Jan. 13, 1965, Ser. No. 425,206
12 Claims. (Cl. 310—270)

This invention relates to dynamoelectric machines and more particularly to a novel end turn insulation protection system. While this invention is applicable to dynamoelectric machines of various winding constructions it is especially suited for use in those machines employing form wound coils and will be particularly described in that connection.

Many dynamoelectric machines, including A-C and D-C motors, generators and converters, employ form wound coils for the winding wherein each coil includes a plurality of layers of copper conductor wound into a closed loop including leads. Insulation having the desired dielectric properties is then applied to the outer surface of the coil prior to installing the coil into the core member of the machine. Portions of such coils, known as end turns, usually extend beyond the ends of the core member. When the machine is placed in operation these coils are subjected to large currents both during starting and when peak loads are suddenly applied. Such large currents develop extremely strong magnetic fields of varying intensity which link adjacent coil end turns and cause them to move. This movement causes adjacent end turns to rub together, chafing and eventually causing the insulation thereon to wear through to cause short circuits and the premature failure of the machine. This problem is a particularly serious one, for example, in special-purpose motors such as those used on bridges, shovels, hoists or other operations which require frequent reversals or starting and stopping.

Although it has been proposed to minimize such effects by employing thicker and/or more wear resistant insulation on the end turns, such an approach has been far from satisfactory and the problem has remained. For example, not only was it found that such previous attempts failed to solve the problem but the thicker insulation adversely affected cooling thereby introducing additional serious problems. Known prior art attempts at solving the problem have been directed to the provision of means for preventing end turn displacement, such as by employing various bracing, binding or supporting techniques or some combination thereof. Various of such prior art means have proven reasonably effective in preventing end turn displacement to a reasonable degree, however, sufficient relative movement between adjacent end turns is present so that a significant amount of chafing and wear-through of the end turn insulation still occurs to cause premature machine failures. Moreover, although prior art bracing systems have been developed for stator coil end turns which are capable of restricting end turn movement to a reasonable degree, no correspondingly effective system has so far been developed for restricting the movement of the end turns of the coils of rotating armatures. For example, the presently available rotor end turn binding and supporting means are exceptionally effective in preventing radial displacement of the end turns due to centrifugal forces but are relatively ineffective in preventing relative movement of adjacent end turns due to magnetic, vibratory and thermal cycling forces. Accordingly, the end turn insulation wear-through problem persists and is particularly serious in D-C machines operating on severe duty cycles such as for example D-C motors used on shovels, hoists and the like.

It is an object of this invention, therefore, to provide an end turn arrangement which allows for end turn movement in a manner essentially free of insulation abrasion.

It is another object of this invention to provide a novel end turn arrangement which substantially overcomes the long-standing end turn insulation wear-through problem by promoting a reasonable degree of free, abrasionless movement of the end turns rather than attempting to prevent all end turn movement.

Briefly stated, in accordance with one aspect of this invention, premature machine failure due to such insulation wear-through has been substantially overcome by the insertion of a strip of low friction plastic material between the overlapping end turns which operates to promote, rather than attempt to restrict, movement of the end turns. The strip of low friction plastic material must be capable of withstanding a compressive force of about 500 p.s.i. even at the maximum machine operating temperature without having the elastic limit thereof exceeded so that such material operates to maintain a finite separation between the end turns and also promotes a degree of free, essentially abrasionless movement between the end turns and the strip. Low friction plastic materials found to provide especially satisfactory results are polytetrafluoroethylene, polytrifluorochloroethylene, combinations of such materials, as well as other materials suitably treated with such low friction plastic materials.

As used throughout the specification and in the appended claims, the term "treated" is intended to be given its broadest interpretation so as to include any modification of the material, whether by coating, impregnating, or otherwise, to impart thereto the desired low friction surface properties.

Figure 2:
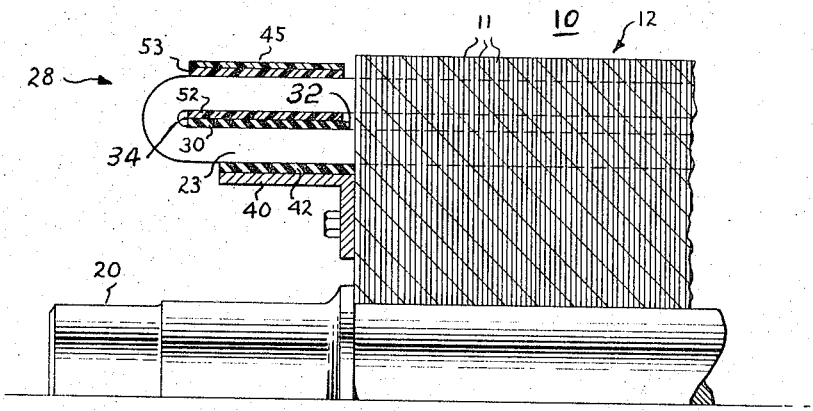

The novel features believed characteristic of this invention are set forth with particularity in the appended claims. The invention itself, however, together with its organization and mode of operation, as well as further objects and advantages thereof, may best be understood by reference to the following description taken in conjunction with the accompanying drawings in which:

FIG. 1 is a fragmentary sectionalized view of a portion of an electrical member of a dynamoelectric machine incorporating this invention; and, FIG. 2 is a partial sectional view of a form wound rotor of a dynamoelectric machine incorporating this invention.

In FIG. 1 there is shown a portion of an electrical member 10 of a dynamoelectric machine. Member 10, which may be a rotor, for example, includes a plurality of laminations 11 of magnetic material forming a core 12. Core 12 is provided with a plurality of axially extending, peripheral slots 13 into which coils 14 are disposed to provide the winding for the member 10.

Coils 14 may be of any suitable type arranged to provide either a form or random wound member. Since the invention is especially suited for use in making form wound members, particularly rotors, it will be described in detail in that connection. Accordingly, the form wound coils may be of the well-known type made up of a number of conductors assembled together in a closed loop with coil leads for connection to a commutator (not shown). The entire loop is then covered, such as by wrapping, with a material having the desired electrically insulating properties to provide coil-to-coil and ground insulation. Member 10, shown more particularly in FIG. 2 as a rotor, is suitably mounted on the shaft 20 and arranged to coact electrodynamically with a suitable stator member (not shown) in well-known manner to provide a complete dynamoelectric machine.

As is well known, the winding of core 12 may be either form or random wound. Moreover, the winding may be made up of full form wound coils or of the so-called halfcoils wherein each coil includes two coil sides of electrically insulated copper strap conductors which are placed separately in different slots of the core and connected at their ends by suitable connectors.

Each of the coils 14 has a top coil side 22 and a bottom coil side 23 and are disposed in the winding slots 13 in the usual manner. The coil sides are insulated from the slots by a suitable slot liner 25 formed of an electrically insulating material. Because of the fact that one coil side 22 must be arranged to lie in the top of a winding slot while the other coil side 23 thereof must lie in the bottom of a slot displaced a preselected number of electrical degrees therefrom, the end turns 28 of the various coils making up a complete winding are in an overlapping relationship.

As is the usual practice, top-to-bottom electrical insulation is provided between these overlapping end turns 28 by inserting therebetween a rectangular strip 30 of electrically insulating sheet material such as a resin impregnated glass cloth, for example. Strip 30 usually extends in width from the end 32 of the core 12 to the inside contour or "nose" portion 34 of the end turns 28.

The extending end turns 28 are supported against the effect of centrifugal force, to prevent excessive displacement thereof, by binding such end turns tightly against an annular supporting member 40 which is secured to the core 12 and underlies a portion of the projecting end turns 28. Member 40 may be formed of electrically insulating material, or, as shown particularly in FIG. 2, may be constructed of metal suitably insulated such as by the layer of electrical insulation 42. As shown, the layer of electrical insulation is disposed between the outer peripheral surface of the member 42 and the bottom of the end turns 28.

Preferably, the end turns are supported against displacement resulting from the effects of machine operating forces in accordance with the teachings of U.S. Patent No. 2,747,118, Petersen et al. wherein a rigid supporting structure 45 is provided by overlapping convolutions of roving formed of a fibrous material impregnated with a thermosetting resinous material and suitably cured. Such a supporting structure is exceptionally effective in preventing excessive radial displacement of the end turns 28 due to centrifugal force. Even with such a structure, however, the end turns still exhibit relative movement not only with respect to each other but also with respect to the supporting structure 45 as well as with respect to core 12 and underlying support member 40 due to the effects of inertia and magnetic, vibratory and thermal cycling forces. Moreover, the support structure 45 tends to compress the end turns 28 of the various coils together which tends to bring the vertically adjacent surfaces into contact with each other especially at the cross-over regions thereof. Heretofore, therefore, the relative movement of the end turns caused the electrical insulation at these contacting end turn surfaces to wear-through and cause premature machine failure.

Unexpectedly, however, and contrary to all the previous prior art teachings, the foregoing premature machine failures due to insulation wear-through have been obviated in accordance with this invention by promoting a degree of free movement. This is accomplished by inserting a strip 52 of a low friction plastic material between the overlapping end turns 28. This strip of low friction plastic material operates as a "slipper strip" which maintains a finite separation between the overlapping end turns and also promotes a degree of free, essentially abrasionless movement between the end turns and the slipper strip. If desired, a strip of low friction plastic material may be inserted both above and below the electrically insulating strip 30. For most applications, however, it has been found that a single strip 52 between the top and bottom end turn portions provides entirely satisfactory results.

The strip 52 of low friction plastic material must be capable of maintaining a finite separation between the top and bottom end turn portions and promoting free sliding movement therebetween throughout the entire operating temperature range of the machine. To this end, therefore, the strip of low friction plastic material must be capable of withstanding a compressive force of about 500 p.s.i. at the maximum operating temperature of the machine without having the elastic limit thereof exceeded. This assures not only maintenance of the desired separation of the top and bottom portions of the end turns 28 but also the promotion of the free, essentially abrasionless movement of the end turns against the low friction surfaces of the strip 52.

It has also been found that premature machine failures may occur as a result of insulation wear-through between the outer surface of the end turns 28 and the inner surface of the supporting structure 45. Thus, although insulation wear-through in this region does not result in immediate short circuits, such as is the case with worn through insulation between the top and bottom end turn portions, shorting and/or grounding do eventually occur as a result of the establishment of low resistance creepage paths due to the accumulation of moisture and/or contaminants, such as electrically conductive dusts and the like.

Preferably, therefore, a similar strip 53 of low friction plastic material is also placed adjacent the outer surface of end turns 28 prior to the application thereto of the supporting structure 45. That is, the strip 53 is disposed between the overlapping convolutions of resin impregnated roving and the outer surface of the end turns 28 to promote a degree of free, essentially abrasionless movement between the end turns and the surface of the strip 53.

Low friction plastic materials found to be especially suited for use in this invention are those materials known in the art as the fluorocarbons. In particular, especially satisfactory results have been obtained with "slipper strips" formed of materials selected from the group consisting of polytetrafluoroethylene, polytrifluorochloroethylene, combinations of such materials and various other materials treated therewith. Such fluorocarbon resin materials are sold under the trademark Teflon by the E. I. du Pont de Nemours Company. Entirely satisfactory results have been obtained by forming the strips 52 and 53 from Teflon sheet material having a thickness in the range of about 10–15 mils.

In addition to the foregoing, various materials such as glass cloth, glass mat, asbestos fiber sheets, and the like may be suitably treated with a lubricating-type, low friction plastic material, such as one of the foregoing fluorocarbon resinous materials, to impart thereto the desired low friction surface properties. For example, glass cloth impregnated with Teflon has been found to be satisfactory and to exhibit both especially good resistance to cut-through and the required low friction surface properties. Also, filled fluorocarbon materials, such as those sold by the Dixon Corporation under the trademark Rulon have been found to be suitable for use in this invention. Also, for those applications where the maximum machine operating temperature will not be above about 100° C., the polyamide resinous materials, commonly known as the nylons, are suitable.

Although the coefficient of friction between the surface of the strip 52 (or 53) and the electrical insulation of the end turns has never been determined in a given machine under operating conditions, it has been determined that the coefficient of friction of the surface of the strip, on itself, should be less than 0.2 (the coefficient of friction of Teflon on Teflon, for example, is about 0.04).

From the foregoing specification it will be apparent that the present invention provides electrical members for dynamoelectric machines, especially form wound armatures for direct current machines, having outstanding advantages. It will be understood also that similar advantages may be achieved with random wound members and with stators, such as stators of A-C machines, as well as rotors.

In accordance with this invention, therefore, free movement between the end turns 28 is promoted rather than restricted but, contrary to all expectations and prior art teachings, such relative movement is not accompanied by any substantial chafing and premature wear-through of the electrical insulation.

While only certain preferred features of the invention have been shown by way of illustration, many modifications and changes will occur to those skilled in the art and it is, therefore, to be understood that the appended claims are intended to cover all such modifications and changes as fall within the true spirit and scope of the invention.

What I claim as new and desire to secure by Letters Patent of the United States is:

1. In a member for a dynamoelectric machine including a core having slots therein, coils in said slots having overlapping end turns projecting axially outwardly from said slots providing the electrical winding for said member, and means for supporting the end turns against the effects of machine operating forces to prevent excessive displacement thereof, the improvement comprising: a low friction plastic material disposed between the vertically adjacent regions of said overlapping end turns, said material being capable of withstanding a compressive force of about 500 p.s.i. at the maximum operating temperature of said machine without having the elastic limit thereof exceeded to maintain a finite separation between said overlapping end turn regions and promote a degree of free essentially abrasionless movement between said end turn regions and the material disposed therebetween.

2. The member of claim 1 wherein said low friction plastic material is a fluorocarbon resin.

3. The member of claim 1 wherein said low friction plastic material is selected from the group consisting of polytetrafluoroethylene, polytrifluorochloroethylene, combinations thereof and materials treated therewith.

4. The member of claim 3 wherein said low friction plastic material has a thickness in the range of about 10–15 mils.

5. The member of claim 1 wherein said low friction plastic material exhibits active surfaces having a coefficient of friction less than about 0.2.

6. An electrical member for a dynamoelectric machine comprising: a core formed of magnetic material and having slots therein; windings in said slots including overlapping layers of end turns projecting axially outwardly from said core; a support system arranged to allow a degree of relative movement between adjacent regions of said end turns while preventing excessive radial and circumferential displacement thereof when such end turns are subjected to the operating forces of said machine; and a strip of low friction plastic material disposed between at least the directly overlapping regions of said end turns to maintain a finite separation therebetween throughout the operating temperature range of the machine and promote a degree of free essentially abrasionless movement between said end turns and said strip of low friction plastic material.

7. The member of claim 6 wherein said strip of low friction plastic material is selected from the group consisting of polytetrafluoroethylene, polytrifluorochloroethylene, combinations thereof and materials treated therewith.

8. The member of claim 7 wherein said strip of low friction plastic material has a thickness in the range of about 10–15 mils.

9. A rotor for a dynamoelectric machine comprising: a core formed of magnetic material and having winding slots therein; windings in said slot having overlapping end turns projecting axially from said core; a strip of low friction plastic material disposed between the overlapping end turns to maintain a finite separation therebetween throughout the operating temperature range of said machine and promote a degree of free, essentially abrasionless movement between said end turns and said strip; means for supporting said end turns against centrifugal force comprising a plurality of overlapping convolutions of roving formed of a flexible fibrous material impregnated with a thermosetting resinous composition cured to form a rigid supporting structure; and a strip of low friction plastic material disposed between said end turns and said roving to promote a degree of free essentially abrasionless movement between the top surfaces of said end turns and the under surface of said rigid supporting structure.

10. An electrical member for a dynamoelectric machine comprising: a magnetic core including a number of stacked laminations having slots disposed therein; coils in said slots including overlapping layers of electrically insulated end turns projecting axially outwardly from said core and providing the winding thereof; a rigid support system for restricting said end turns against substantial displacement; and at least one layer of a low friction plastic sheet materials disposed between the overlapping layers of end turns, said sheet material having active surfaces exhibiting a coefficient of friction less than about 0.2 and being arranged in intimate contact with adjacent end turn surfaces and extending along at least the major portion of the length thereof and being capable of withstanding a compressive force of about 500 p.s.i. at the maximum operating temperature of said machine without having the elastic limit thereof exceeded so that a finite separation is maintained between the adjacent surfaces of said end turns and said surfaces slide freely against the surface of said sheet material essentially free of any abrasion of the electrical insulation.

11. The electrical member of claim 10 wherein said sheet material is selected from the group consisting of polytetrafluoroethylene, polytrifluorochloroethylene, combinations thereof and materials treated therewith.

12. The electrical member of claim 11 wherein said sheet material has a thickness in the range of about 10–15 mils.

References Cited

UNITED STATES PATENTS

| | | | |
|---|---|---|---|
| 2,989,657 | 6/1961 | Sampson | 310—270 |
| 3,047,756 | 7/1962 | Coggeshall | 310—270 |
| 3,192,423 | 6/1965 | Pearson | 310—201 |

MILTON O. HIRSHFIELD, *Primary Examiner.*

R. W. TEMPLETON, *Assistant Examiner.*